(12) United States Patent
Hodge

(10) Patent No.: US 10,819,704 B2
(45) Date of Patent: Oct. 27, 2020

(54) SYSTEM AND METHOD FOR AUTHENTICATING CALLED PARTIES OF INDIVIDUALS WITHIN A CONTROLLED ENVIRONMENT

(71) Applicant: **Global Tel*Link Corporation**, Reston, VA (US)

(72) Inventor: Stephen Hodge, Aubrey, TX (US)

(73) Assignee: **Global Tel*Link Corporation**, Reston, VA (US)

( * ) Notice: Subject to any disclaimer, the term of this patent is extended or adjusted under 35 U.S.C. 154(b) by 0 days.

(21) Appl. No.: 16/595,018

(22) Filed: Oct. 7, 2019

(65) Prior Publication Data

US 2020/0036832 A1    Jan. 30, 2020

Related U.S. Application Data

(63) Continuation of application No. 15/299,303, filed on Oct. 20, 2016, now Pat. No. 10,462,285, which is a
(Continued)

(51) Int. Cl.
*H04W 4/00* (2018.01)
*H04L 29/06* (2006.01)
(Continued)

(52) U.S. Cl.
CPC ........ *H04L 63/083* (2013.01); *H04L 63/0861* (2013.01); *H04M 1/72525* (2013.01); *H04M 3/2281* (2013.01); *H04M 3/382* (2013.01); *H04M 3/42102* (2013.01); *H04M 3/4365* (2013.01); *H04M 15/47* (2013.01); *H04M 17/10* (2013.01); *H04M 17/30* (2013.01); *H04M 17/308* (2013.01); *H04W 12/0602* (2019.01); *H04W 12/0608* (2019.01);
(Continued)

(58) Field of Classification Search
CPC ............... H04L 63/083; H04L 63/0838; H04L 63/0853; H04L 63/0861; H04L 63/0876; H04M 3/2281; H04M 3/42102; H04M 3/4211; H04M 3/4365
See application file for complete search history.

(56) References Cited

U.S. PATENT DOCUMENTS

| | | |
|---|---|---|
| 6,138,030 A | 10/2000 | Coombes et al. |
| 6,798,872 B1 | 9/2004 | Matsumoto et al. |

(Continued)

*Primary Examiner* — Dai Phuong
(74) *Attorney, Agent, or Firm* — Sterne, Kessler, Goldstein & Fox P.L.L.C.

(57) ABSTRACT

A method and system are described for enhancing the security of calls made by a member of a controlled environment to an outside party, particularly when the outside party communicates via a cellular phone. An application is provided for the cellular device, which must communicate and register with a calling platform of the controlled environment. Certain elements of personal verification data are obtained by the user of the cellular device and stored at the calling platform for later reference. Calls from the inmate to the cellular device cause the calling platform to issue a notification to the user via the application. The user verifies his/her identity using the application, after which the call can be connected. As a further security measure, certain conditions can be required and periodically checked during the call to ensure the user remains verified.

20 Claims, 6 Drawing Sheets

Related U.S. Application Data continuation of application No. 14/267,383, filed on May 1, 2014, now abandoned.

(51) Int. Cl.

| | | |
|---|---|---|
| *H04M 3/436* | (2006.01) | |
| *H04M 17/00* | (2006.01) | |
| *H04M 15/00* | (2006.01) | |
| *H04M 3/22* | (2006.01) | |
| *H04W 12/06* | (2009.01) | |
| *H04M 1/725* | (2006.01) | |
| *H04M 3/38* | (2006.01) | |
| *H04M 3/42* | (2006.01) | |

(52) U.S. Cl.
CPC ............ *H04M 15/48* (2013.01); *H04M 15/83* (2013.01); *H04M 15/8351* (2013.01); *H04M 15/858* (2013.01); *H04M 2203/6045* (2013.01); *H04M 2203/6081* (2013.01)

(56) References Cited

U.S. PATENT DOCUMENTS

| | | | |
|---|---|---|---|
| 7,158,621 B2 | 1/2007 | Bayne | |
| 7,305,090 B1 | 12/2007 | Hayes et al. | |
| 8,050,393 B2 | 11/2011 | Apple et al. | |
| 8,582,738 B1 | 11/2013 | Keiser | |
| 9,426,303 B1 | 8/2016 | Edwards et al. | |
| 9,699,304 B1 | 7/2017 | Hodge | |
| 10,462,285 B2 | 10/2019 | Hodge | |
| 2002/0034940 A1 | 3/2002 | Takae et al. | |
| 2002/0080751 A1 | 6/2002 | Hartmaier | |
| 2003/0161464 A1 | 8/2003 | Rodriguez et al. | |
| 2004/0213396 A1 | 10/2004 | MacNamara et al. | |
| 2005/0043014 A1* | 2/2005 | Hodge .................. | H04M 1/67 455/411 |
| 2005/0195950 A1 | 9/2005 | Lee et al. | |
| 2006/0277256 A1 | 12/2006 | Tiruthani et al. | |
| 2007/0049248 A1 | 3/2007 | Dawson et al. | |
| 2007/0140448 A1 | 6/2007 | Lin et al. | |
| 2008/0057976 A1 | 3/2008 | Rae et al. | |
| 2008/0102746 A1 | 5/2008 | Amador et al. | |
| 2008/0293390 A1 | 11/2008 | Yang et al. | |
| 2008/0304438 A1 | 12/2008 | Stille | |
| 2009/0042541 A1 | 2/2009 | Yi et al. | |
| 2009/0281904 A1 | 11/2009 | Pharris | |
| 2010/0111274 A1 | 5/2010 | Bayne | |
| 2010/0128707 A1 | 5/2010 | Horio et al. | |
| 2011/0196753 A1 | 8/2011 | Hodgdon et al. | |
| 2011/0207454 A1 | 8/2011 | Garg et al. | |
| 2011/0258680 A1 | 10/2011 | Rathus et al. | |
| 2012/0077496 A1 | 3/2012 | Mathias et al. | |
| 2012/0295601 A1 | 11/2012 | Lang | |
| 2012/0331527 A1 | 12/2012 | Walters et al. | |
| 2013/0194377 A1 | 8/2013 | Humphries | |
| 2013/0225129 A1 | 8/2013 | Norbisrath et al. | |
| 2013/0267204 A1 | 10/2013 | Schultz et al. | |
| 2014/0120906 A1* | 5/2014 | Luo .................. | G06Q 10/10 455/426.1 |
| 2014/0126825 A1* | 5/2014 | Luo .................. | G06Q 10/10 382/190 |
| 2014/0171037 A1 | 6/2014 | Park | |
| 2014/0181886 A1 | 6/2014 | Goodman et al. | |
| 2014/0302829 A1 | 10/2014 | Won | |
| 2014/0324654 A1* | 10/2014 | Arnald .................. | G06Q 30/018 705/35 |
| 2014/0329514 A1 | 11/2014 | Meriaz et al. | |
| 2014/0335827 A1 | 11/2014 | Tsuda | |
| 2014/0378149 A1 | 12/2014 | Lau et al. | |
| 2015/0044983 A1 | 2/2015 | Nasir et al. | |
| 2015/0065102 A1 | 3/2015 | Chung et al. | |
| 2015/0172452 A1 | 6/2015 | Kobayashi et al. | |
| 2015/0229770 A1 | 8/2015 | Shuman et al. | |
| 2015/0244706 A1 | 8/2015 | Grajek et al. | |
| 2015/0319612 A1 | 11/2015 | Hodge | |
| 2016/0078281 A1 | 3/2016 | Gongaware et al. | |
| 2016/0093305 A1 | 3/2016 | Chang | |
| 2016/0127528 A1 | 5/2016 | Cho et al. | |
| 2016/0283923 A1* | 9/2016 | Hertel .................. | G06Q 30/0222 |
| 2016/0351010 A1* | 12/2016 | Williams ............ | G07F 17/3237 |
| 2016/0379328 A1 | 12/2016 | Smith | |
| 2017/0041787 A1 | 2/2017 | Hodge | |
| 2017/0134468 A1 | 5/2017 | Torgersrud et al. | |
| 2017/0324721 A1 | 11/2017 | Kormann et al. | |
| 2019/0287327 A1* | 9/2019 | Saravanan ............... | G07C 9/28 |

\* cited by examiner

SYSTEM AND METHOD FOR AUTHENTICATING CALLED PARTIES OF INDIVIDUALS WITHIN A CONTROLLED ENVIRONMENT

CROSS-REFERENCE TO RELATED APPLICATIONS

This application is a Continuation Application of U.S. patent application Ser. No. 15/299,303, filed Oct. 20, 2016, which is a Continuation Application of U.S. patent application Ser. No. 14/267,383, filed May 1, 2014, which are both incorporated by reference herein in their entirety.

DISCLOSURE

Technical Field

The disclosure relates to a system and method for identifying and authenticating called parties and/or fund contributors of members of a controlled environment.

RELATED ART

In controlled environments, such as prisons for example, member (hereinafter "inmate") communications with individuals outside the controlled environment are carefully regulated and monitored. As part of a communications system within a controlled environment, the inmate or somebody on the inmate's behalf can set up a deposit account to be used by the inmate to pay for telephone calls, internet access, etc. When the inmate makes a telephone call, funds can be drawn from the deposit account.

Although a person creating a deposit account on behalf of an inmate may be required to provide certain personal information in order to verify his identity and/or address, there are many alternative ways for an inmate to mask a source of funding for a particular call. For example, the inmate can use a prepaid calling card, or the call can be made collect, both of which are substantially anonymous.

BRIEF DESCRIPTION OF THE DRAWINGS/FIGURES

Embodiments are described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

Figure 1:
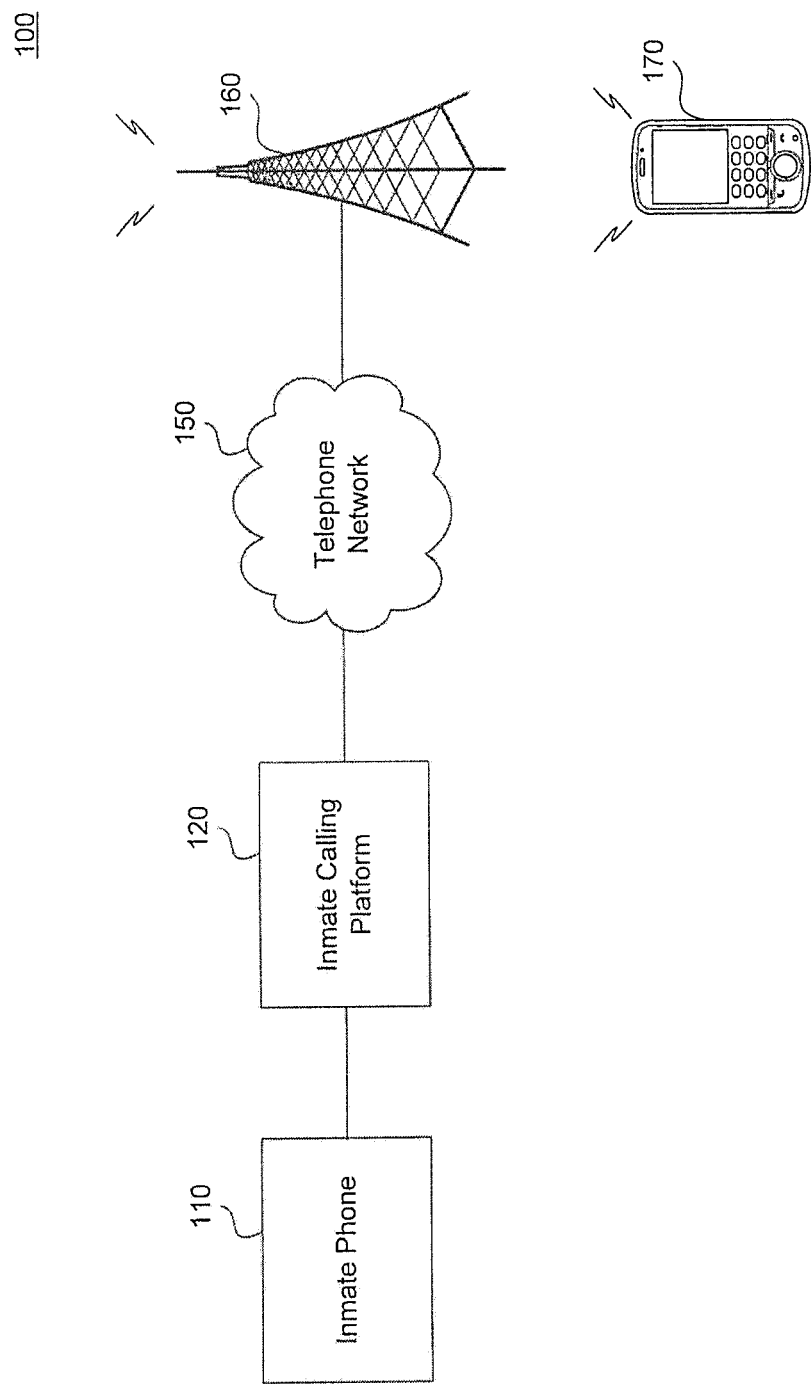
FIG. 1 illustrates an inmate calling environment according to an exemplary embodiment.

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the invention. Rather, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer, as described below.

For purposes of this discussion, any reference to the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although the description below is made with respect to a prison facility or other controlled environment, the disclosed systems and methods can be used in any communication environment.

Inmate Calling Environment

FIG. 1 illustrates a block diagram of an inmate calling environment 100 according to an exemplary embodiment. In the inmate calling environment 100, an inmate of the controlled environment makes a telephone call via an inmate telephone 110. The inmate telephone 110 communicates with an inmate calling platform 120.

The inmate calling platform 120 manages several aspects of the call and call processing, including call routing, user authentication, billing, monitoring, etc. After processing the signals received from the inmate telephone 110, the inmate calling platform 120 transmits those signals to the telephone 170 of a called party via a telephone network 150.

In embodiments, any of the various connections of the inmate calling environment 100 can be VoIP, and that the inmate telephone 110 can be a wireless, macro-cellular, or personal telephone.

In an embodiment, the called telephone 170 is a cellular telephone that receives the signals from the telephone network 150 via a base station 160 connected to the telephone network 150. When the called telephone 170 is a cellular telephone, conventional called party identification may easily be subverted. Specifically, even as little as 20 years ago, conventional landline telephones dominated mainstream use and were registered with a person's name and a billing address that typically matched their residential address. With this information, called parties could easily be identified.

However, this registration process can easily be subverted with the advent of cellular telephones. As one example, cellular telephones can easily be registered in the name of one person, and physically owned by another. As another example, more recently, disposable cellular telephones commonly referred to as "burners" have become popular, especially among drug dealers and other criminals. These burners can be purchased and prepaid in cash and do not require any registration or identity verification.

Because of the anonymity of many cellular telephones, conventional inmate calling environments are unable to acquire any information of called parties beyond their phone numbers. Specifically, provided that a particular number is not on an inmate's "blacklist" (e.g., a list of prohibited contact numbers for that particular inmate), the inmate is generally permitted to call that particular number. Further, although conventional systems request permission to complete the call from the called party, this request typically amounts to nothing more than a single key press (e.g., "#"). As such, calls are permitted between the inmate and anonymous persons without acquiring any identifying information of the called parties.

To address this situation, the exemplary calling environment 100 includes an inmate calling platform 120 to enhance data gathering and security regarding called telephones, as described below.

Called Party Identification

Figure 2:
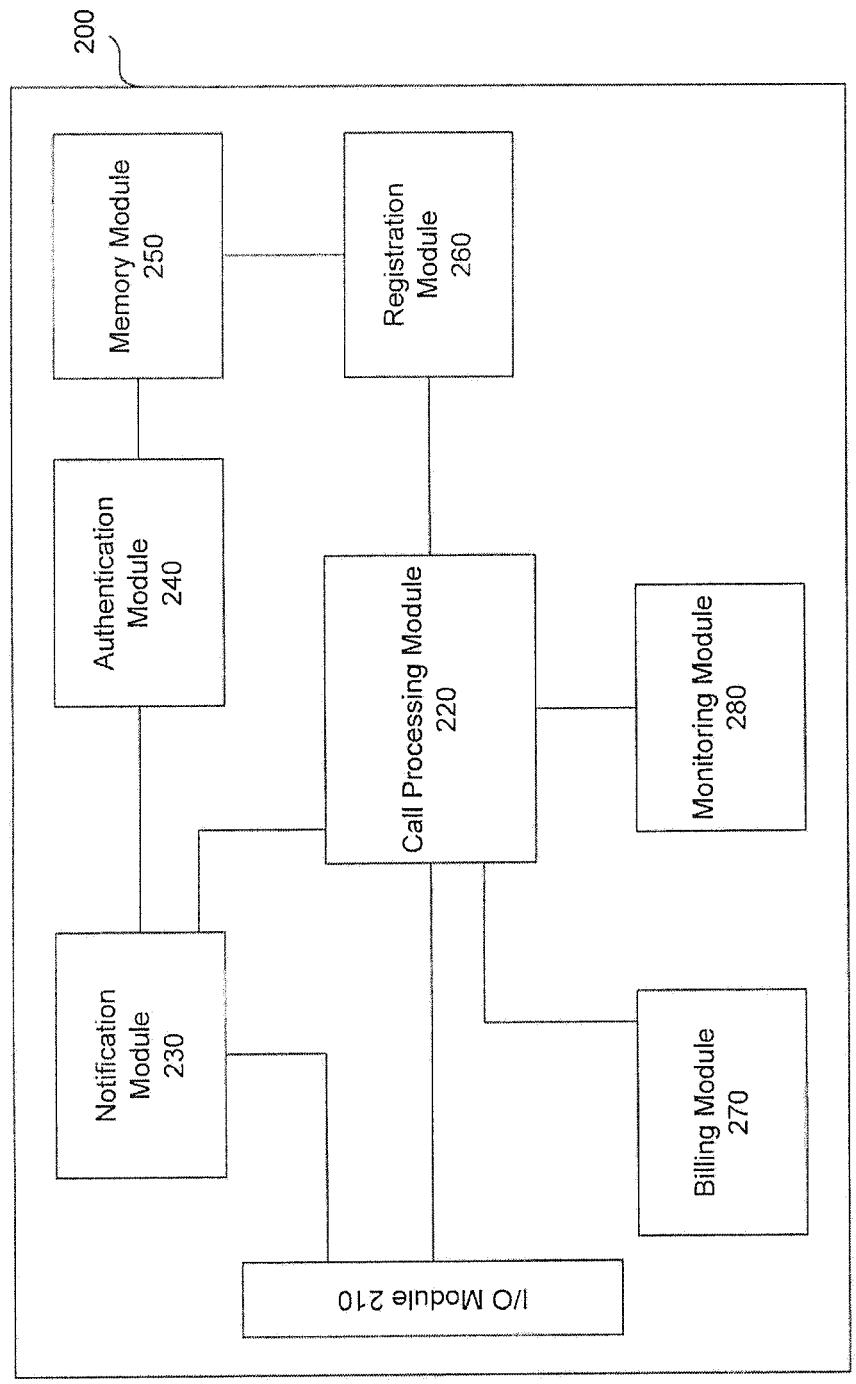
FIG. 2 illustrates an inmate calling platform according to an exemplary embodiment.

In order to facilitate called party identification, the inmate calling platform 120 requires cooperation from a cellular telephone before calls can be placed. FIG. 2 illustrates a block diagram of an inmate calling platform 200 according to an exemplary embodiment. In an embodiment, the inmate calling platform 200 includes an I/O module 210, a call processing module 220, a notification module 230, an authentication module 240, a memory module 250, and a registration module 260, and optionally includes a billing module 270 and a monitoring module 280, and may represent an exemplary embodiment of the inmate calling platform 120.

Figure 3:
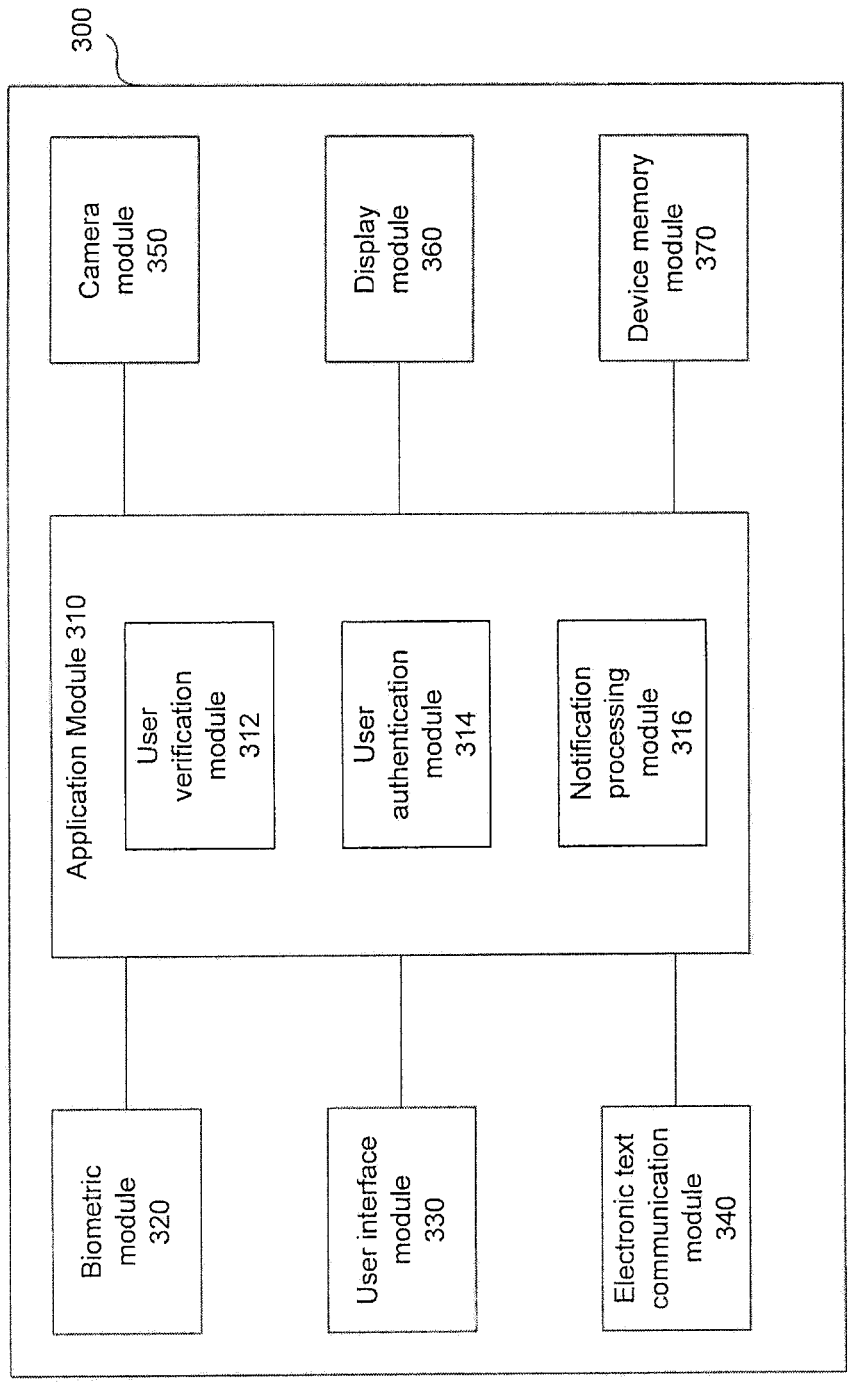
FIG. 3 illustrates a cellular telephone according to an exemplary embodiment.

FIG. 3 illustrates a block diagram of a device 300 according to an exemplary embodiment. In an embodiment, the device 300 includes an application module 310 (that includes a user verification module 312, a user authentication module 314, and a notification processing module 316), a biometric module 320, a user interface module 330, an electronic text communication module 340, a camera module 350, a display module 360, and a device memory module 370, and may represent an exemplary embodiment of the cellular telephone 170.

A system for identifying called parties will now be described relative to FIGS. 2 and 3.

Outside Party Registration

As previously mentioned, one goal of the present disclosure is to acquire identifying information of a particular called party. One way to achieve this goal is to restrict inmate calls to or from cellular telephones unless those cellular telephones and their users have been pre-registered with the inmate calling platform 200. The pre-registration involves the cellular telephone user submitting certain personal information to the inmate calling platform 200 for storage and later reference. In embodiments, the registration process described below is initiated either upon the outside number first being called from the prison facility, or upon the outside number first placing a call to the prison facility. In an embodiment, in either scenario, the call processing module 220 places the inmate on hold (or delay call connection) while at least a portion of the registration process takes place, and then connect the user with the inmate following the completion of that portion.

In order to perform this registration, as well as many other functions as will be described herein, the cellular telephone user downloads a mobile application (e.g., an "app") that handshakes and communicates with the inmate calling platform 200. As shown in FIG. 3, the application module 310 of the device 300 includes the functionality of the app. Device 300 can be, for example, a cellular telephone or smartphone.

Upon installation and loading of the app, the app performs an initial registration of the user. For example, the app is pre-registered with the specific controlled environment or prison of the inmate or the desired controlled environment(s) is selected from a list. Once selected, the app prompts the user via the display module 360 for one or more pieces of identifying information, which device 300 acquires using the various hardware capabilities common among cellular telephones and smartphones.

For example, in an embodiment the application module 310 prompts the user to input various biometric data using the device's biometric module 320. The biometric data capable of being acquired will be dependent on the hardware capabilities of the biometric module 320, but may include one or more fingerprints, a retinal scan, and/or a voiceprint, among others.

In an embodiment, the application module 310 prompts the user to input a password and/or personal identification number (PIN) to be associated with that user. Upon being prompted, the user could interface with the user interface module 330 in order to enter the password/PIN information.

In an embodiment, the application module 310 prompts the user to submit a photo of his/her face using the camera module 350. The facial photo is later be used for facial recognition purposes, etc. In an embodiment, the application module 310 also requests the user to capture an image of a picture ID using the device's camera module 350. This can be particularly useful because most picture IDs include some form of a description of the person, as well as a known address of that person. As most current picture IDs include some form of a barcode, in an embodiment, the application module 310 prompts the user to capture a picture of the barcode, which is then analyzed for identifying information. In an embodiment, the application module 310 provides the option to the user of capturing an image of a utility bill or other piece of mail with their name and address printed thereon.

Once the application module 310 has received a predetermined amount of personal verification data from the user, the user verification module 312 of the application module 310 connects to the inmate calling platform 200. The user verification module 312 packages the user's personal verification data, and transmits that data to the inmate calling platform 200. In an embodiment, the user verification module 312 transmits the personal verification data together with at least one of a device phone number and a device identification number associated with the cellular telephone of a user.

At the inmate calling platform 200, incoming and outgoing communications pass through the I/O module 210. The call processing module 220 performs general information processing and routing. Therefore, as the user verification module 312 connects with the inmate calling platform, the initial request is routed through the I/O module 210 and the call processing module 220 to the registration module 260, which performs the initial registration of users.

The registration module 260 handshakes with the device 300 and receives the personal verification data from the user. Once the personal verification data is received, the registration module 260 registers the user and the device with the inmate calling platform 200 by storing the telephone number and/or device identification number in the memory module 250. The registration module 260 also stores the various pieces of personal verification information in the memory module in association with the telephone/device number. In this manner, the user's personal verification information and the phone device becomes registered to the telephone number of the user. As such, future phone calls to this number will be known to be made to the user registered, as will be discussed in further detail below.

Once the user has been successfully registered, the registration module 260 issues a notification to the device 300 of the successful registration. In an embodiment, as an added level of security, the registration module 260 causes a letter to be mailed to the address provided in order to confirm that the address is current. In order to perform this action, the registration module 260 notifies authorized personal to generate the letter and provide the necessary information of the user, or the registration module 260 generates the letter (alone or in conjunction with a separate module and/or device). In this embodiment, only after the letter has been returned to a particular address with certain personal verification information of the user filled in is the successful notification transmitted to the application module 310 of the device 300.

In an embodiment, the registration module 260 provides the option or requires that the user elect for geofencing capabilities. Geofencing permits the user's location to be tracked before, during, and/or after a call for use by the inmate calling platform 200 in investigative functions. In an embodiment, the location information is tracked and compiled by the app loaded on the device 300, and transmitted to the inmate calling platform 200 at predetermined times (e.g., the end of a call). In this manner, the inmate calling platform 200 provides useful information for investigation purposes.

Once successfully registered, the device 300 is permitted to receive telephone calls from the inmate.

Although described above as a app for a cellular telephone, in another embodiment, the functionality of the registration process can be embodied on a website. The user accesses the website to verify his personal and contact information in order to gain calling access. In another embodiment, the functionality of the registration process is achieved using "traditional" telephones. In this embodiment, the user contacts an 800 or equivalent service number. Once connected to the service number, a computer system or live agent directs the caller through the process of registering his account.

Calls to Registered User

Once the device 300 has been registered with the inmate calling platform 200, the inmate is able to call the device 300 user. In doing so, the inmate calling platform 200 will interact with the app on the registered device in order to facilitate the communication.

As discussed above, one problem with conventional inmate telephone calls is that the called party is able to accept the call by a single button press, without any further identifying information. In the exemplary calling system, an inmate places a call from a local telephone within or managed by the controlled facility. This call is routed to the inmate calling platform 200 via its I/O module 210. The call is received by the call processing module 220, which first detects whether the inmate is permitted to call the called number.

Calls placed to certain telephone numbers can be blocked for many reasons. For example, inmates are generally restricted from calling witnesses or judges associated with their case, victims or victim family members, etc. Therefore, as an initial check, the call processing module 220 accesses a blocked call list from the memory module 250 associated with the inmate in order to determine whether the desired number is blocked. If the number is not blocked, the call processing module 220 performs a subsequent check to determine whether the number is associated with a device, such as device 300. This can be done locally, or by accessing a national/global phone number registry, etc.

If the number is not associated with a device, such as device 300, the call processing module 220 processes the call as normal, for example, by contacting the called party and requesting acceptance from the called party before connecting the call. In another embodiment, the call processing module 220 prompts the non-wireless user to acquire a PIN via a different method, as discussed below. If it is determined that the phone number is associated with a device, such as device 300, the call processing module 220 accesses the memory module to determine if the telephone number has been registered.

If the call processing module 220 determines that the phone number being called has not been registered with the inmate calling platform 200, then the call processing module 220 causes the notification module 230 to generate a notification, which the inmate calling platform 200 transmits to the called number via the I/O module 210. The notification can be a pre-recorded voice message, an SMS text message, an email message, or other notification, and is used to inform the recipient that a member of the controlled facility seeks to contact them, as well as provide instructions as to how to acquire and install the necessary app for communicating with the inmate. Once the notification has been transmitted, the call processing module 220 terminates the inmate's telephone call, and optionally provides a notification to the inmate as to the reason for the termination.

If the call processing module 220 determines that the telephone number is registered, the call processing module 220 causes the notification module 230 to generate a notification to be transmitted to the called party via the I/O module 210. In this case, the notification informs the called party that an inmate of the controlled facility seeks to talk with the called party, and also provides the name and/or other identifying information of the inmate. In an embodiment, the notification is configured to be received by the application module 310 of the device 300.

The notification processing module 316 receives the notification from the inmate calling platform 200 and extracts the identifying information of the inmate, as well as the indication that a call is being requested. The application module 310 causes the display module 360 to graphically notify the user of the device 300 that a call is being requested from the inmate, and prompts the user to accept or reject the call via the user interface module 330. If the user accepts the call, the application module 310 controls the user authentication module 314 to verify the user's identity, such as by prompting for and verifying the user's PIN number.

In an embodiment, the application module 310 tracks a time from notifying the device user, and if the user fails to respond accept or reject the call within a predetermined amount of time, the application module 310 responds to the inmate calling platform 200 with a "timeout" notification. Alternatively, this timing is performed directly by the inmate calling platform 200. When the notification times out, the inmate calling platform terminates the call.

If the user rejects the call, the notification processing module 316 transmits a "call rejected" notification to the inmate calling platform 200, at which time the call processing module 220 terminates the inmate's call. In an embodiment, upon rejecting a call from an inmate, the application module 310 further prompts the user as to whether the user would like to block future calls from the inmate. The user's response to this query is included in the "call rejected" notification, which the call processing module 220 uses to update its blocked number list.

On the other hand, if the user accepts the call, the user authentication module 314 prompts the user via the display module 360 to enter his PIN. In response, the user enters his PIN via the user interface module 330, which the user authentication module 314 receives. The user authentication module 314 authenticates the user by comparing the entered PIN to the registered PIN stored in the device memory module 370. If a mismatch is detected, the user authentication module 314 re-prompts the user for his PIN a predetermined number of times. When the user ultimately fails to enter the correct PIN, the notification processing module 316 transmits an "authentication failed" notification to the inmate calling platform 200. The call processing module 220 then terminates the call. In an embodiment, the call processing module 220 further flags the registered phone number with a "caution" flag, which is later referenced to indicate the need for additional security for this number, whether by requiring call monitoring, additional identification information from the called party, and/or similar requirements.

If the user authentication module 314 determines that the user has entered the correct PIN, the notification processing module 316 transmits an "authentication successful" notification to the inmate calling platform 200. Once the call processing module 220 receives the "authentication successful" notification, the call processing module 220 causes the inmate's call to be connected to the user's device. In an embodiment, the notification processing module 316 includes the user's PIN in the "authentication successful" notification to allow the inmate calling platform to perform an independent authentication of the user using authentication module 240. This prevents a user of the device from subverting the system by tampering with the stored identification information at device 300.

In an embodiment, the authentication module 314 requires alternative or additional identification information from the user other than the PIN. Also, upon successful authentication of the user, the call processing module 220 causes the notification module 230 to transmit a "conditions" notification to the device 300. This "conditions" notification includes various conditions that the called party must satisfy in order to maintain the call. For example, the called party may be required to keep their face in sight of the device's camera, may be prohibited from allowing any other voices on the call, may be required to submit biometric or other identifying information at intervals throughout the call, etc. The satisfaction of these parameters is checked and monitored by the user authentication module 314 of the device 300.

When the user authentication module 314 detects that the user has failed any of the set conditions, the application module 310 takes any of various actions, including muting the line, muting the call, placing the parties on hold, and/or terminating the call. In addition, the application module 310 also transmits a notification to the inmate calling platform 200 to take appropriate action, such as adding the called number to the blocked number list, or flagging the called number with a "caution" flag for increased security for future calls.

Through the cooperation of the app on the device 300 and the inmate calling platform 200, enhanced security and monitoring is provided for calls made to cellular telephones, smart phones, and similar devices. Further, because the app and the inmate calling platform 200 communicate the various errors and/or other statuses between each other, they are each able to enhance their own functionality based on the occurrences taking place at the other.

Non-Wireless Phones

Although the above discussion is largely directed towards cellular telephones, at least a portion of the benefits resulting from the above configurations can be achieved for non-wireless phones through. Although the inmate calling platform 200 can not require a POTS phone to install an app for handshaking therewith, the platform 200 can nonetheless require registration of the phone for purposes of authenticating the phone during calls to or from the controlled environment.

As discussed above, upon receiving a request to place a call between an inmate and a number that has not been registered with the platform 200, the call processing module 220 makes a determination as to whether the unregistered number is associated with a cellular telephone. The above discussion details procedures for handling a cellular telephone. However, when the call processing module 220 determines the phone to be a non-wireless telephone, the call processing module 220 prompts the user of the non-wireless telephone to register a PIN. In an embodiment, the call processing module 220 directs the non-wireless telephone user to a live person or computerized system for acquiring the user's personal information and administering the user a PIN. The registration module 260 then registers the phone number with the PIN in the memory module 250 for later reference.

Because of the time-consuming steps that may be involved in the registration process, and the likelihood of disconnecting from the call with the inmate, in an embodiment the inmate calling platform 200 informs the user to acquire a PIN before establishing a first call with the user's number, but allow the first call to continue following the notification. The inmate calling platform 200 then stores the user's number for future reference to bar further calls until the number has been registered and received a PIN. In an embodiment, the inmate calling platform 200 places other restrictions on the first (unregistered) call, such as by restricting the length of the call, performing live monitoring, etc.

After the user has been registered, the call processing module 220 authenticates the user upon when called or calling by requesting and confirming the user's PIN. In this manner, the inmate calling platform 200 provides a level of security relating to non-wireless telephone calls.

Method of Registering a Phone

Figure 4:
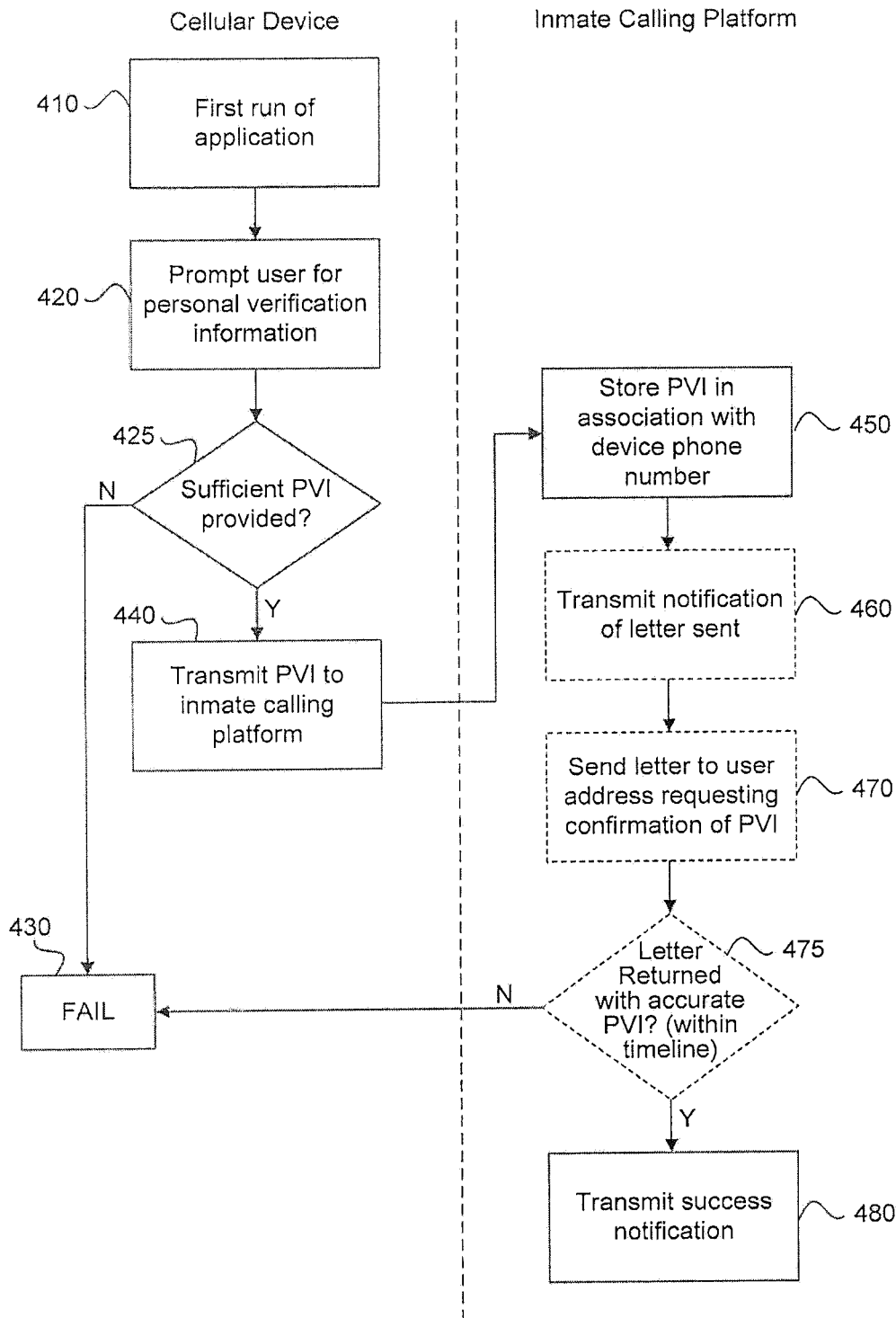
FIG. 4 illustrates a flowchart diagram of an exemplary method for registering a cellular phone with an inmate calling platform.

FIG. 4 illustrates a flowchart diagram of an exemplary method for registering a cellular telephone with an inmate calling platform. In an embodiment, the app is run by the application module 310 of the device 300, and registers with the inmate calling platform 200. In an embodiment, the device 300 is a cellular telephone.

When the app is installed and first run (410), the app prompts the user for personal verification information (420). In an embodiment, the app requires multiple pieces of personal verification information. After the app has prompted for the personal verification information (420), the app checks to determine whether the user has complied and provided sufficient personal verification information (425). If the user has not provided sufficient personal verification information (425—N), then the registration fails (430).

If, on the other hand, the app determines that the user has provided sufficient personal verification information (425—Y), the app compiles, packages, and transmits the personal verification information to the inmate calling platform (440).

At the inmate calling platform 200, the registration module 260 causes the personal verification information to store the personal verification information in the memory module 250 in association with the device phone number and/or device identification number (450).

Optionally, the inmate calling platform 200 then requests an additional level of verification. In particular, the notification module 230 transmits a notification to the device 300 informing him that a letter has been sent to a home, email, or other address and requesting the user to verify that address by responding when received. If the response is not received within a predetermined time (475—N), the registration fails (430). On the other hand, if the response is received with the predetermined time (475—Y), the notification module 230 transmits a "success" notification back to the device 300 in order to complete the registration.

The above description of the exemplary method is for illustrative purposes and can be modified in accordance with any of the functionality previously described with respect to the inmate calling platform 200 and/or the device 300.

Method of Calling an Outside Party

Figure 5:
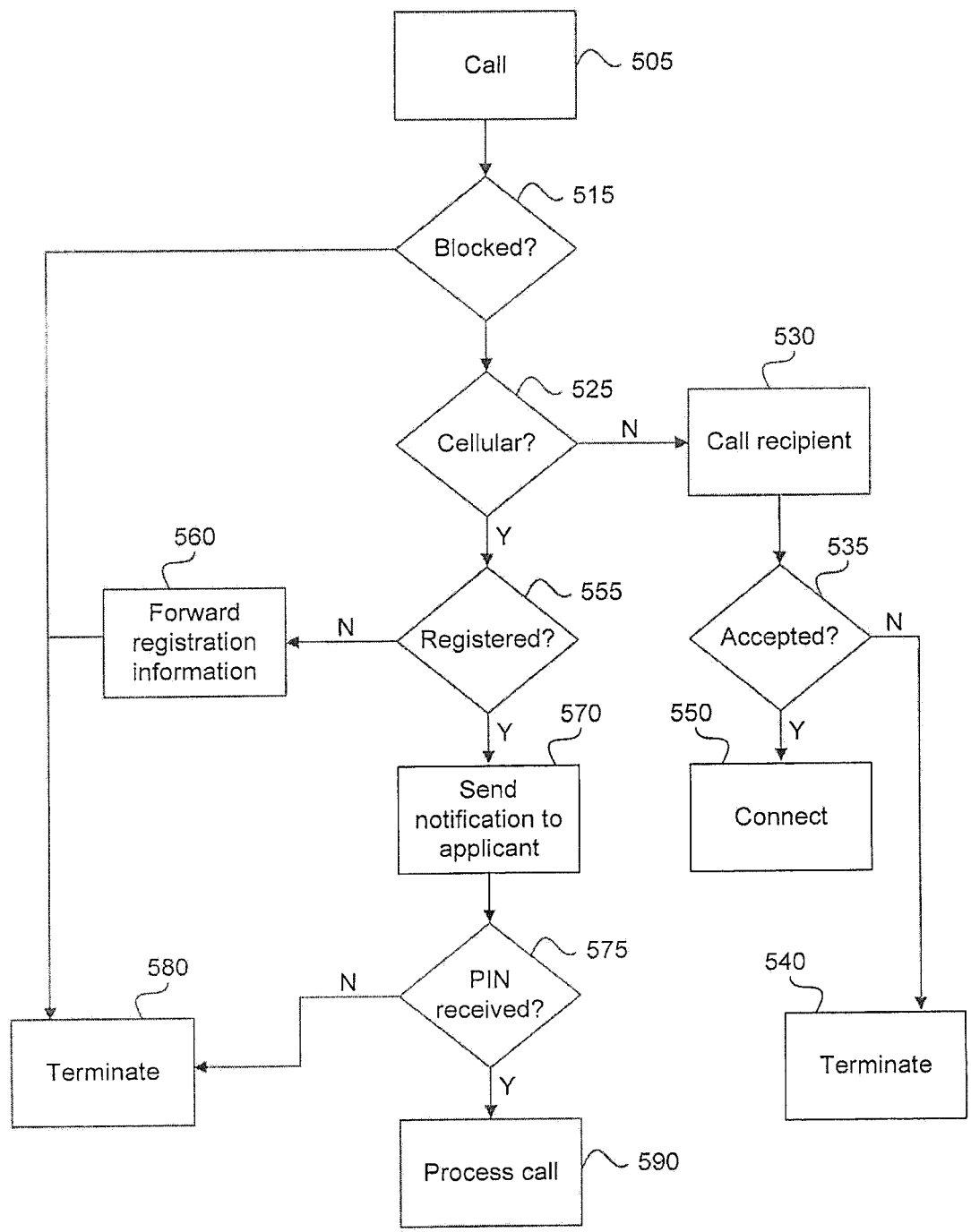
FIG. 5 illustrates a flowchart diagram of a method for processing an outgoing call by an inmate at an inmate calling platform.

FIG. 5 illustrates a flowchart diagram of a method for processing an outgoing call by an inmate at an inmate calling platform. In an embodiment, the call is processed by the inmate calling platform 200.

In the method, an inmate of the controlled facility initiates call (505) by dialing a number to an outside (called) party. Initially, the inmate calling platform 200 determines if the dialed number is on a block list associated with the inmate (515). If the number is blocked (515—Y), the inmate calling platform 200 terminates the call (580). If the number is not on the block list (515—N), the inmate calling platform 200 determines if the dialed number is associated with a device, such as device 300 (525).

In an embodiment, if it is determined that number is not associated with a device, such as device 300 (525—N), the inmate calling platform 200 processes the call as normal. For example, the inmate calling platform 200 calls the recipient 530 and prompts for acceptance of the call. If the call is accepted by the called party (535—Y), the inmate calling platform 200 connects the called party to the inmate. On the other hand, if the call is rejected by the called party (535—N), the inmate calling platform terminates the call 540.

If the inmate calling platform 200 determines that the number is associated with a device, such as device 300 (525—Y), the inmate calling platform 200 checks to determine whether the called number is registered with the system (555). If it is determined that the called number is not registered (555—N), the inmate calling platform 200 forwards registration information to the called party (560) and terminates the call (580). The registration information can be forwarded by email or other electronic message, by a pre-recorded voice message, or other suitable method.

If the called number is registered with the inmate calling platform 200 (555—Y), the inmate calling platform 200 sends a call notification to the device 300. The inmate calling platform 200 then checks whether the PIN (or other personal verification information) has been received (575). If the PIN is not received within a predetermined time, or does not match the registered PIN (575—N), the inmate calling platform 200 terminates the call. Alternatively, if the PIN is received within the predetermined time and matches the registered PIN (575—Y), the inmate calling platform 200 processes the call by connecting the inmate to the called party.

As discussed above, in an embodiment, the inmate calling platform 200 processes all calls in accordance with the registration process. In other words, all called numbers are checked for registration in order to process the calls. This omits steps (525)-(550) from the method described above.

The above description of the exemplary method is for illustrative purposes and can be modified in accordance with any of the functionality previously described with respect to the inmate calling platform 200 and/or the device 300.

Method of Processing a Call

Figure 6:
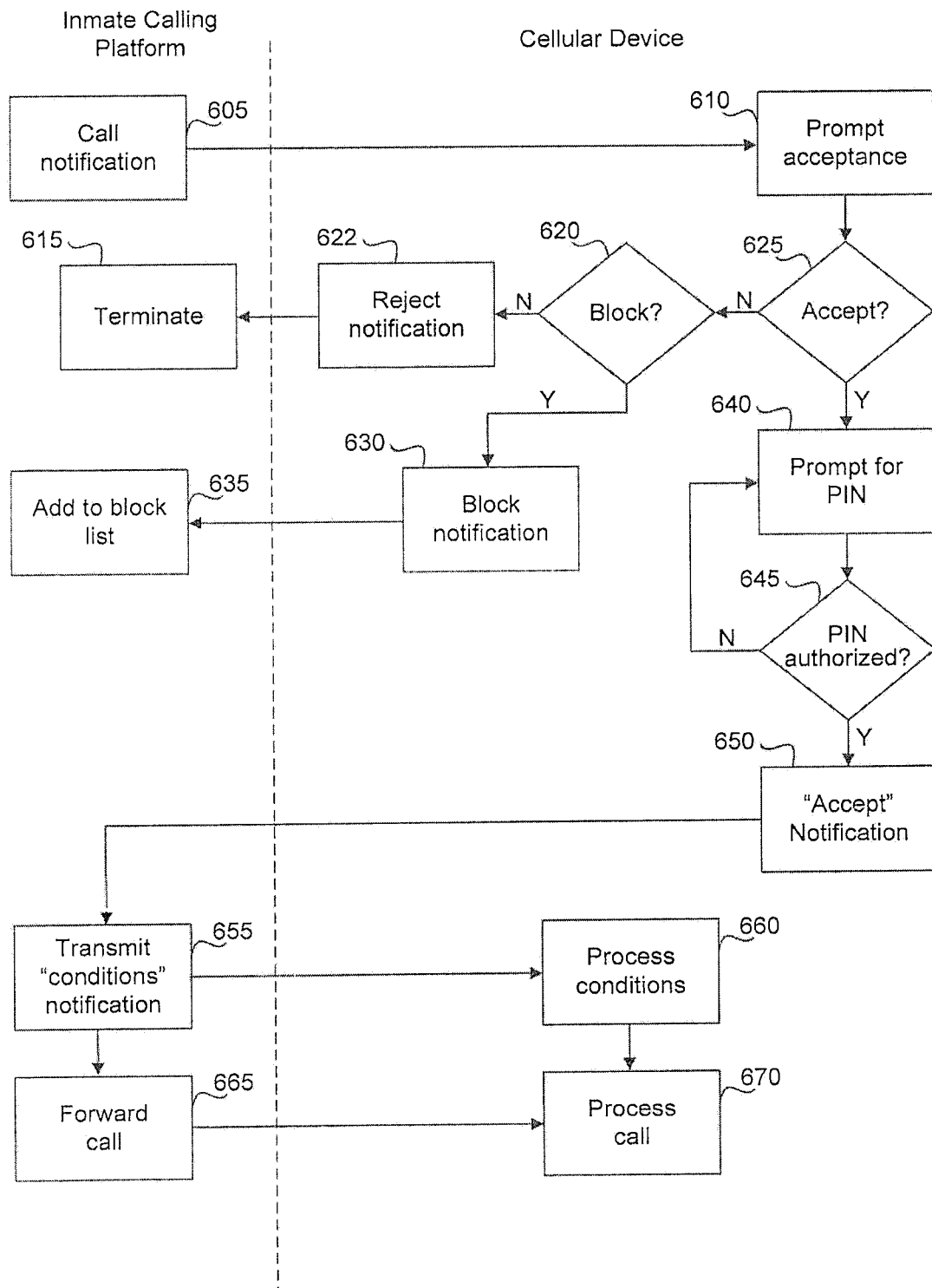
FIG. 6 illustrates a flowchart diagram of a method for processing call acceptance and authentication.

FIG. 6 illustrates a flowchart diagram of a method for processing call acceptance and authentication by a called party. In an embodiment, portions of the method are performed by the inmate calling platform 200 and the device 300. In an embodiment, the device 300 is a cellular telephone.

Upon the call being initiated by an inmate, the inmate calling platform 200 transmits a call notification to the device 300 (605). The device 300 prompts the user to either accept or reject the incoming call (610). If the call is rejected (625—N), the device 300 further prompts the user as to whether he would like to block future calls from the inmate (620). If the user indicates that they would like future calls blocked (620—Y), the device 300 transmits a "block" notification back to the inmate calling platform 200 indicating that the number associated with the device 300 should be added to the inmate's block list (630). In that case, the inmate calling platform 200 will add the number to the block list (625) and terminate the call. Alternatively, if the user responds that he does not wish to block future calls (620—N), then the device 300 issues a "reject" notification (622), which causes the inmate calling platform to simply terminate the call (615).

If the user accepts the call (625—Y), the device 300 next prompts the user for his PIN or other personal verification information (640). Upon entry of the PIN, the device 300 authenticates the user by comparing the entered PIN to a previously stored PIN (645). If the PIN authentication fails (645—N), the device 300 reprompts (640) the user a predetermined number of times before terminating the call. If the PIN authentication is successful (645—Y), the device 300 issues an "accept" notification to the inmate calling platform 200.

Upon receiving the accept notification (and optionally also receiving personal verification information for independently verifying the user's identity), the inmate calling platform 200 transmits a "conditions" notification (655) to the device 300 setting forth the conditions that must be met in order to avoid call interruption/termination. The inmate calling platform 200 then forwards the inmate's call to the device 300 (665).

The device 300 processes the conditions (660) and monitors their satisfaction while processing the call (670) between the inmate and the device user.

The above description of the exemplary method is for illustrative purposes and can be modified in accordance with any of the functionality previously described with respect to the inmate calling platform 200 and/or the device 300.

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the invention should not be limited by any of the above-described exemplary embodiments, but should be defined only in accordance with the following claims and their equivalents.

What is claimed is:

1. A call processing platform for processing telecommunications of a controlled environment, comprising:
a source database that stores a list of reputable sources;
one or more circuits and/or processors configured to:
set up a user account, the setup including:
communicating with an application running on a mobile device associated with a user;
handshaking with the application;
receiving an image of a personal physical printed document of the user via the application;
extracting first personal verification information printed on the personal physical printed document from the image using optical character recognition;
extracting second personal verification information printed on the personal physical printed document from the image using optical character recognition;
determining a source of the personal physical document based on the extracted second personal verification information;
comparing the determined source to the list of reputable sources stored in the source database; and
registering the user, based on the comparing, by storing the first personal verification information included in the image in association with an identifier of the mobile device.

2. The call processing platform of claim 1, wherein the image of the personal physical printed document is an image of a physical printed document that includes a plurality of pieces of personal information of the user.

3. The call processing platform of claim 2, wherein the one or more circuits and/or processors are further configured to extract the pieces of personal information from the image.

4. The call processing platform of claim 2, wherein the plurality of pieces of personal information includes a photo of the user, a name of the user, and an address of the user.

5. The call processing platform of claim 2, wherein the personal physical printed document is a government-issued identification, and
wherein the plurality of pieces of personal information further includes a unique number associated with the user and locality information.

6. The call processing platform of claim 5, wherein the one or more circuits and/or processors are further configured to:
access a locality database corresponding to the locality information; and
verify the unique number and at least one other piece of personal information from among the plurality of pieces of personal information in the database.

7. The call processing platform of claim 6, wherein the one or more circuits and/or processors are further configured to, after the verifying, assign a multi-character acceptance code to the user.

8. A call processing platform for processing telecommunications of a controlled environment, the call processing platform comprising:
a source database that stores a list of reputable sources;
one or more processors and/or circuits configured to:
communicate with an application running on a mobile device associated with a user;
handshake with the application;
receive an image of a personal physical printed document from the application;
extract first personal information printed on the personal physical printed document from the image using optical character recognition;
extract second personal verification information printed on the personal physical printed document from the image using optical character recognition;
determine a source of the personal physical document based on the extracted second personal verification information;

compare the determined source to the list of reputable sources stored in the source database;

verify the extracted personal information based on information stored in a second database; and issue a multi-character acceptance code to the user following the verification.

9. The call processing platform of claim 8, wherein the one or more processors and/or circuits are further configured to:

receive a call attempt from the user, the call attempt including an access code submitted by the user;

determine that the access code matches the multi-character acceptance code assigned to the user; and allow the call to continue based on the determining.

10. The call processing platform of claim 8, wherein the one or more processors and/or circuits are further configured to:

receive a call attempt from the user, the call attempt including an access code submitted by the user;

determine that the access code does not match the multi-character acceptance code assigned to the user; and block the call based on the determining.

11. The call processing platform of claim 8, wherein the one or more circuits and/or processors are further configured to:

receive financial information associated with the user;

setup a payment account associated with the user from which funds for call will be automatically received.

12. The call processing platform of claim 8, wherein the one or more circuits and/or processors are further configured to:

receive a call request from an inmate of the controlled environment that is designated for the user;

issue a notification to the application, the notification indicating an incoming call and requesting authorization to receive the call.

13. The call processing platform of claim 12, wherein the one or more circuits and/or processors are further configured to:

receive, in response to the notification, a call acceptance code;

compare the call acceptance code to the multi-character acceptance code assigned to the user;

determine that the call acceptance code matches the multi-character acceptance code;

and allow the call to continue based on the determining.

14. The call processing platform of claim 12, wherein the one or more circuits and/or processors are further configured to:

receive, in response to the notification, a call acceptance code;

compare the call acceptance code to the multi-character acceptance code assigned to the user;

determine that the call acceptance code does not match the multi-character acceptance code; and block the call based on the determining.

15. A method of processing communications between a calling platform and an external device by the calling platform, the method comprising:

communicating with an application running on a mobile device associated with a user;

handshaking with the application;

receiving an image of a personal physical printed document from the application;

extracting first personal information printed on the personal physical printed document from the image using optical character recognition;

extracting second personal verification information printed on the personal physical printed document from the image using optical character recognition;

determining a source of the personal physical document based on the extracted second personal verification information;

verifying the extracted personal information based on information stored in a database; and issuing a multi-character acceptance code to the user following the verification.

16. The method of claim 15, further comprising:

receiving a call attempt from the user, the call attempt including an access code submitted by the user;

determining that the access code matches the multi-character acceptance code assigned to the user; and allowing the call to continue based on the determining.

17. The method of claim 15, further comprising:

receiving a call attempt from the user, the call attempt including an access code submitted by the user;

determining that the access code does not match the multi-character acceptance code assigned to the user; and blocking the call based on the determining.

18. The method of claim 15, further comprising:

receiving financial information associated with the user;

setting up a payment account associated with the user from which funds for call will be automatically received.

19. The method of claim 18, further comprising:

receiving, in response to the notification, a call acceptance code;

comparing the call acceptance code to the multi-character acceptance code assigned to the user;

determining that the call acceptance code matches the multi-character acceptance code; and allowing the call to continue based on the determining.

20. The method of claim 19, further comprising:

receiving, in response to the notification, a call acceptance code;

comparing the call acceptance code to the multi-character acceptance code assigned to the user;

determining that the call acceptance code does not match the multi-character acceptance code; and blocking the call based on the determining.

* * * * *